United States Patent [19]

Nix

[11] 4,403,188
[45] Sep. 6, 1983

[54] POSITIVELY ACTUATED BRAKE FOR MANUALLY OPERABLE MAGNETIC THICKNESS GAUGES

[75] Inventor: Hans F. Nix, Cologne, Fed. Rep. of Germany

[73] Assignee: Elektro-Physik Hans Nix & Dr. Ing. E. Steingroever, K.G., Cologne, Fed. Rep. of Germany

[21] Appl. No.: 247,240

[22] Filed: Mar. 25, 1981

[30] Foreign Application Priority Data

Apr. 9, 1980 [DE] Fed. Rep. of Germany ....... 3013596

[51] Int. Cl.³ .................... G01B 7/06; G01R 33/12
[52] U.S. Cl. .................................................. 324/230
[58] Field of Search .............. 324/207, 208, 229–231, 324/204

[56] References Cited

U.S. PATENT DOCUMENTS 3,521,160  7/1970  Nix et al. .............................. 324/230
4,152,846 11/1978  Steinbgroever et al. ........... 324/230
4,164,707  8/1979  Nix .................................... 324/230

FOREIGN PATENT DOCUMENTS 1136915 12/1968 United Kingdom ................ 324/230

Primary Examiner—Gerard R. Strecker
Assistant Examiner—Warren S. Edmonds
Attorney, Agent, or Firm—Fisher, Christen & Sabol

[57] ABSTRACT

A layer-thickness meter for measuring the thickness of a non-magnetic layer upon a ferromagnetic substrate wherein the force required to raise from the layer to be measured a permanent magnet carried in a balanced lever arm is measured by means of a spring and taken as a measure of the layer thickness, the spring being stressed by rotation of a scale disc graduated in terms of layer thickness and co-operating with an index mark upon a housing of the meter, the circumferential edge of said disc being serrated or indented for engagement by a pawl so as to lock the disc in response to detachment of the permanent magnet from the layer surface, said pawl comprising a pivotally mounted bearing plate from which project two rigid stops which between them loosely embrace said lever arm at a location along said arm such that the pawl is actuated through one said stop to disengage from the disc edge when said permanent magnet is in contact with said layer surface and actuated through the other said stop to engage and lock the disc immediately the magnet becomes detached from said surface.

6 Claims, 8 Drawing Figures

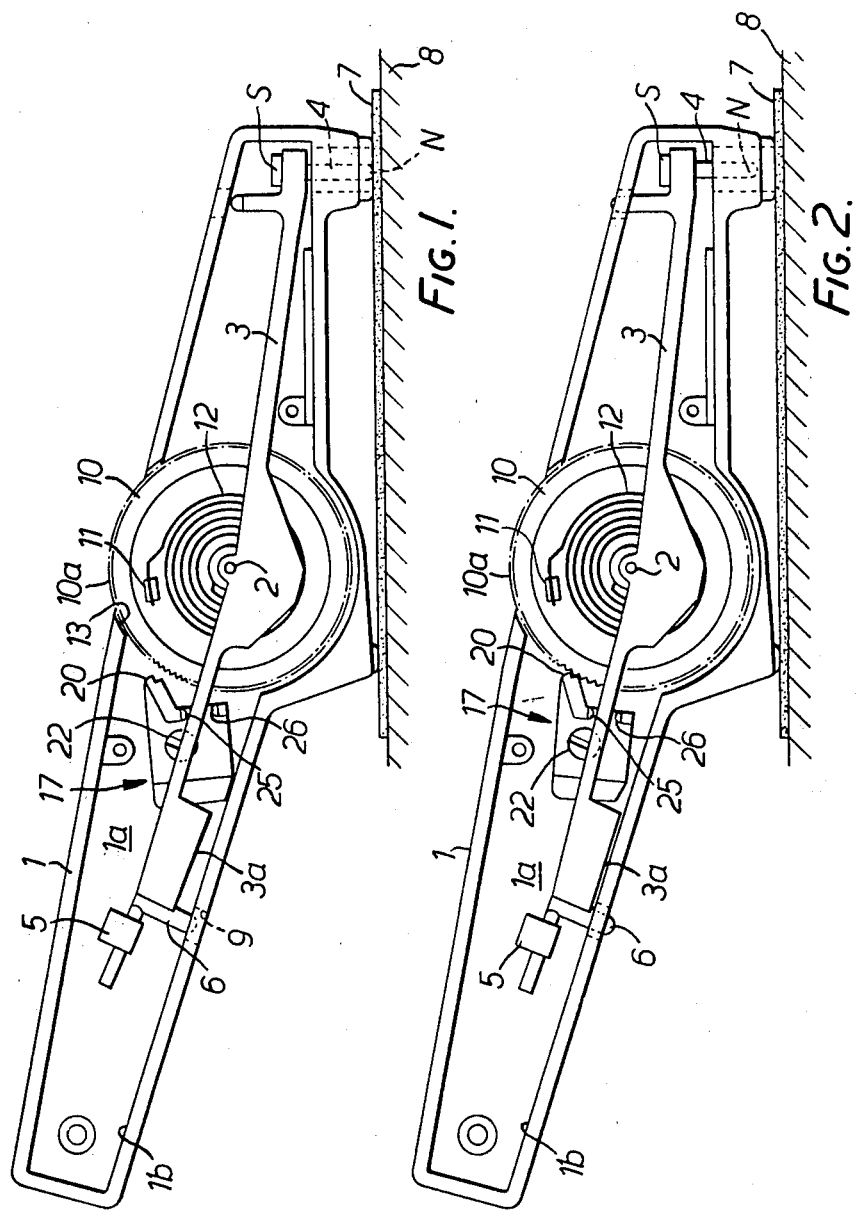

{{REF:4,403,188}}

POSITIVELY ACTUATED BRAKE FOR MANUALLY OPERABLE MAGNETIC THICKNESS GAUGES

BACKGROUND OF THE INVENTION

This invention relates to a layer-thickness meter for measuring the thickness of non-magnetic layers upon ferromagnetic substrates, in which the force of adhesion to the layer being measured of a permanent magnet arranged for rotation upon a balanced lever arm is a measure of the layer thickness and is measured by means of a spring which is stressed by the rotation of a graduated scale disc that co-operates with an index mark on the housing of the meter.

In a known thickness meter of this type, as shown in U.S. Pat. No. 3,521,160, granted to Hans Nix and Erich Steingroever July 21, 1970, a spread arises in the measured values of layer thickness merely from the reason that it is difficult to arrest the movement of the graduated scale disc exactly at the instant of its rotation at which the permanent magnet is raised. Since the reaction time of the operator employing the meter is not always the same, there arise multiple measurement deviations of the measured value which in previously known apparatus could not be eliminated in a simple manner.

An attempt to solve this problem by the inclusion of a pivotally mounted pawl or a friction brake actuated by the balanced arm, to stop the rotation of the graduated scale when the magnet is lifted up from the layer being measured is disclosed in U.S. Pat. No. 4,152,646 granted to Erich A. Steingroever and Hans E. Nix on May 1, 1979 and assigned to the assignee of this application. In this patent, the friction brake can be overcome if excessive force is exerted on the rotary scale, and the pawl mechanism, being actuated by a spring member in contact with the balanced arm sometimes introduces a delay in this actuation.

SUMMARY OF THE INVENTION

It is the purpose of the invention to overcome or reduce these dificulties and to reduce so far as is possible the tolerances in the measurement made that arise from different delays of the scale disc.

According to the present invention there is provided a layer-thickness meter for measuring the thickness of a non-magnetic layer upon a ferromagnetic substrate wherein the force required to raise from the layer to be measured a permanent magnet carried in a balanced lever arm is measured by means of a spring and taken as a measure of the layer thickness, the spring being stressed by rotation of a scale disc graduated in terms of layer thickness and co-operating with an index mark upon a housing of the meter, the circumferential edge of said disc being serrated or indented for engagement by a pawl so as to lock the disc in response to detachment of the permanent magnet from the layer surface, said pawl comprising a pivotally mounted bearing plate from which project two rigid stops which between them loosely embrace said lever arm at a location along said arm such that the pawl is actuated through one said stop to disengage from the disc edge when said permanent magnet is in contact with said layer surface and actuated through the other said stop to engage and lock the disc immediately the magnet becomes detached from said surface.

Through the construction of the pawl in accordance with the invention the advantage results that upon lowering the balanced lever arm into the measuring position against a surface to be measured, the pawl is moved almost without inertia away from the circumferential edge of the scale disc into the release position and remains there until, upon the slightest raising movement of the magnet from the measuring surface and hence upon the slightest displacement of the lever arm, the pawl is acted upon practically without inertia and is moved back suddenly into the locking position against the serrated or indented circumferential edge of the scale disc by the rigid stop resting against the lever arm. As long as the magnet is raised from the measuring surface, turning the scale disc forwards will cause the stop lug of the pawl to ratchet audibly along the serrated circumferential edge of the disc and, upon lowering the magnet onto the measuring surface, the stop lug will immediately come out of engagement with the scale disc, thereby providing a signal which can not be ignored by the operator. The scale disc is then able to turn back in order to start the actual measuring process to determine, by the necessary breakaway force of the magnet, the thickness of the non-magnetic layer which is being measured.

In a particularly advantageous embodiment of the invention, the two rigid stops may be formed on opposite sides of a horizontal slot open at the side in a broadened head portion of the pawl. A pawl of this kind may be produced as a casting from metal or plastics. The engagement of the pawl in the serrated circumference of the scale disc can be improved further in a simple manner by providing the stop lug of the pawl with at least two teeth extending across the edge of the serrated scale disc. The slot between the two stops may reach approximately as far as the bearing plate of the pawl.

In a modified embodiment of the invention the two rigid stops on the pawl may be made as pins. Furthermore, instead of the broadened head portion, the pawl may include a leaf spring acting as a spring catch which engages in the serrated circumference of the scale disc by a catch edge which, if necessary, is bent down towards the edge of the disc. In this modified embodiment, the pawl may be made particularly light and the leaf spring offers the possibility of reducing the noise which arises from the ratcheting along the edge of the serrated scale disc.

BRIEF DESCRIPTION OF THE DRAWING

Preferred embodiment of the invention are illustrated diagrammatically in the accompanying drawings, in which:

FIG. 1 shows a layer-thickness meter with half the housing removed, in which the permanent magnet is in contact with the coated surface of a specimen;

FIG. 2 shows the layer-thickness meter of FIG. 1 in the raised position of the magnet from the surface of the specimen;

DESCRIPTION OF THE PREFERRED EMBODIMENT OF THE INVENTION

Figure 3:
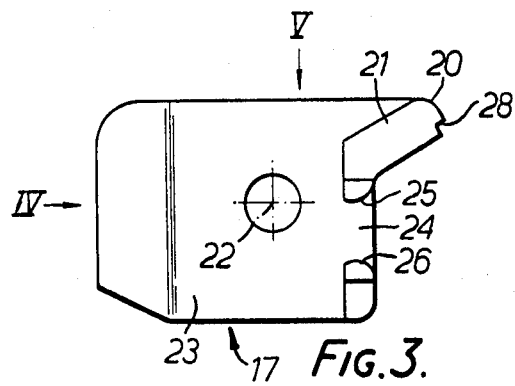
FIG. 3 shows a first embodiment of the pawl of the layer-thickness meter of FIGS. 1 and 2 in an enlarged side elevation.

FIGS. 1 and 2 show the generally hammer-shaped housing 1 of a layer thickness gauge, in which a rotatable system is mounted on a transverse pivot shaft 2. On the shaft 2 is fastened a balanced lever arm 3, to the free front end of which is fitted a permanent magnet 4, of which the poles are designated by N and S. At the opposite end of the balanced layer arm there are a fixed balance weight 3a and an adjustable balance weight 5, through which the weight of the permanent magnet is balanced.

The lever arm 3 includes a button 6. Upon the separation of the permanent magnet 4 from the surface of the layer 7 to be measured, which is situated upon a ferromagnetic substrate 8, the button emerges through an aperture 9 in the underside of the housing 1. By finger pressure against the button 6 the permanent magnet 4 may again be applied to the measuring surface and the measurement thus repeated.

A graduated scale disc 10, which is rotatable with respect to the lever arm 3, is seated on the shaft 2 and is connected to the lever arm 3 through an anchor boss 11 and a spiral spring 12 fastened to the boss. The scale disc cooperates with an index mark (not shown) on the housing 1.

The movement of the rotatable system is effected by means of the graduated scale disc 10 which has a serrated or indented circumferential edge 10a which is accessible in the region of an upper opening 13 in the housing and turning the disc 10 tightens the spiral spring 12 which is connected to the pivot shaft 2.

In the rear part of the housing 1, against the sidewall 1a and behind the disc 10, a pawl 17 is pivotally supported. The pawl secures the disc 10 in dependence upon the breakaway movement of the permanent magnet 4, due to the resultant pivoting of the lever arm 3. The pawl 17 has a stop lug 20 which in the measuring position shown in FIG. 1 is raised from the circumferential edge 10a of the disc 10 and which, in the raised position of the magnet 4 shown in FIG. 2, engages in the serrated or indented circumferential edge 10a of the disc 10 to lock it.

Figure 4:
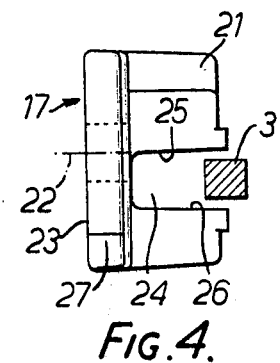
FIG. 4 shows an end elevation of the pawl in the direction of the arrow IV in FIG. 3.
Figure 5:
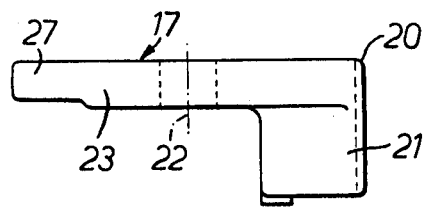
FIG. 5 shows a plan of the pawl in the direction of the arrow V in FIG. 3.

As may be seen in the detail illustrations of FIGS. 3 to 5, taken in conjunction with FIGS. 1 and 2, the pawl 17 is made as a counterbalanced component having a bearing plate 23 resting against the sidewall 1a of the housing and a broadened head portion 21 which in the region of the stop lug 20 between the pivot 22 of the pawl 17 and the circumference of the scale disc 10 is bent round from the bearing plate 23 towards the side. A little below the pivot 22 of the pawl there is, on the broadened head portion 21, a U-shaped slot 24 open to one side, which extends in depth to the bearing plate 23 so that the two opposite edges of the slot 24 form two rigid stops 25, 26. These stops project from the bearing plate 23 above and below the rear portion of the lever arm 3, which is rectangular in cross-section, so as to enclose the lever arm 3 loosely between them. The pawl 17 is made with a counterweight portion 27 lying opposite from the head portion 21 in such a way that, in the various positions of the lever arm 3, the pawl is actuated by one of the two stops 25, 26 being engaged by the upper side or the lower side respectively of the lever arm 3.

For improvement of the engagement of the stop lug 20 in the serrated or indented circumferential edge 10a of the disc 10, the lug 20 may be provided with at least two teeth as may be seen in FIGS. 1 and 2 and at the location 28 in FIG. 3.

If the lever arm 3 is lying in the raised position of the magnet 4 shown in FIG. 2, upon turning the disc 10 forwards (i.e. clockwise as seen in the drawing) the pawl 17 ratchets with its toothed stop lug 20 along the serrated circumferential edge 10a of the disc until the magnet 4, either by actuation of the button 6 or by the action of the spiral spring 12, has come into contact with layer 7 to be measured. Upon subsequent turning back of the disc 10 anti-clockwise, as soon as the magnet 4 is raised from the measuring surface 7 upon the magnetic force of attraction being exceeded by the spiral spring 12, the pawl will immediately engage in the circumferential edge of the disc 10.

Figure 6:
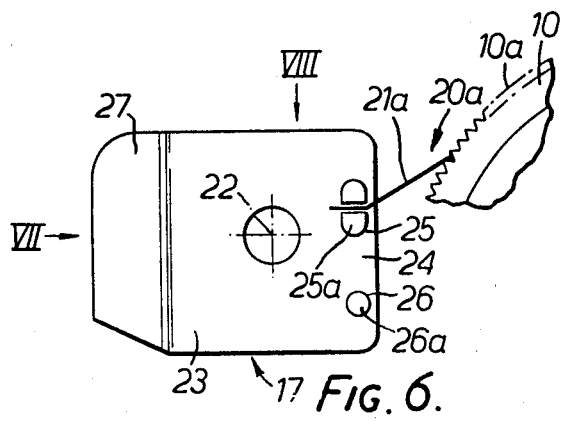
FIG. 6 shows a second embodiment of the pawl of the layer-thickness meter of FIGS. 1 and 2 in enlarged side elevation.
Figure 7:
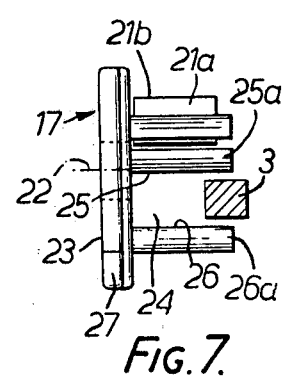
FIG. 7 shows an end elevation of the pawl in the direction of the arrow VII in FIG. 6.
Figure 8:
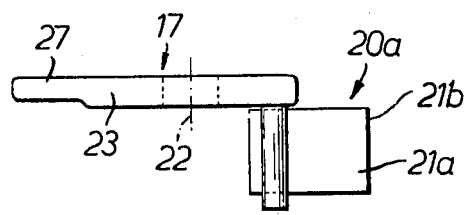
FIG. 8 shows a plan of the pawl in the direction of the arrow VIII as in FIG. 6.

The second embodiment of the pawl 17 shown in FIGS. 6 to 8 of the drawing operates in exactly the same way. In the case of this embodiment the two rigid stops 25, 26 are made as pins 25a, 26a which project from the bearing plate 23 and, just as described in the case of the first embodiment, enclose the lever arm 3 loosely between them. Furthermore, this embodiment includes a leaf spring 21a acting as a spring catch or stop lug 20a which projects from the bearing plate 23 in a similar way to the broadened head portion 21 and is directed at an acture angle towards the serrated circumferential edge of the disc 10. The engagement with the circumferential edge 10a may be still further improved by the leaf spring 21a being formed with a bent down catch edge 21b in order to drop still more easily into the grooves. Because of its low weight the leaf spring 21a, during clockwise turning of the disc 10, slides more lightly along the circumferential edge 10a than the head portion 21 of the first-described embodiment.

What we claim is:

1. In a layer-thickness meter for measuring the thickness of a non-magnetic layer upon a ferromagnetic substrate wherein the force required to raise from the layer to be measured a permanent magnet carried in a balanced lever arm is measured by means of a spring and taken as a measure of the layer thickness, the spring being stressed by rotation of a scale disc graduated in terms of layer thickness and co-operating with an index mark upon a housing of the meter, the circumferential edge of said disc being serrated or indented for engagement by a pawl so as to lock the disc in response to detachment of the permanent magnet from the layer surface, the improvement which comprises:

a bearing plate including catch means for one-way locking engagement with the serated edge of said scale disc;

said bearing plate being tiltably mounted in the housing for movement of the catch means into, and out of, said one-way locking engagement;

said bearing plate including two spaced rigid stop elements transversely with respect to the direction of movement of the balanced lever arm and having opposed surfaces between which said arm is loosely embraced;

said bearing plate being tilted in one direction to positively move and maintain the catch means out of said one-way locking engagement with the scale disc edge by contact between one of the stop elements and the balanced arm when the magnet is in contact with a layer surface;

said bearing plate being positively tilted in the opposite direction to immediately move and maintain the catch means into said one-way locking engagement with the scale disc edge by contact between the other of the stop elements and the balanced arm when the magnet becomes detached from said surface.

2. A layer-thickness meter as defined in claim 1, wherein said bearing plate includes a projecting head portion, said stop elements being defined by a horizontal slot provided in said head portion and open at one end.

3. A layer-thickness meter as defined in claim 2, wherein the other end of said slot is approximately in alignment with the surface of the bearing plate.

4. A layer-thickness meter as defined in any one of claims 1, 2 or 3, wherein the catch means is provided with at least two teeth engageable with the serrated edge of the disc.

5. A layer-thickness meter as defined in claim 1, wherein said two stop elements comprise a pair of pins secured to said bearing plate.

6. A layer-thickness meter as defined in any one of claims 1, 2, 3 or 5 wherein said catch means comprises a leaf spring mounted at one end on said bearing plate and extending toward the serrated edge of the disc in a direction so that locking force is transmitted approximately in the direction of the length of said spring.

* * * * *